US008607567B2

(12) United States Patent
Palkes et al.

(10) Patent No.: US 8,607,567 B2
(45) Date of Patent: Dec. 17, 2013

(54) SOLAR STEAM GENERATOR

(75) Inventors: Mark Palkes, Glastonbury, CT (US); Bard C. Teigen, Enfield, CT (US)

(73) Assignee: ALSTOM Technology Ltd, Baden (CH)

( * ) Notice: Subject to any disclaimer, the term of this patent is extended or adjusted under 35 U.S.C. 154(b) by 1044 days.

(21) Appl. No.: 12/421,047

(22) Filed: Apr. 9, 2009

(65) Prior Publication Data

US 2009/0261591 A1 Oct. 22, 2009

Related U.S. Application Data

(60) Provisional application No. 61/045,361, filed on Apr. 16, 2008.

(51) Int. Cl.
*F03G 6/00* (2006.01)

(52) U.S. Cl.
USPC .................................. 60/641.11; 60/641.15

(58) Field of Classification Search
USPC .................... 60/641.8–641.15, 653
See application file for complete search history.

(56) References Cited

U.S. PATENT DOCUMENTS

| 4,245,618 | A | * | 1/1981 | Wiener | 126/643 |
| 4,387,574 | A | | 6/1983 | Becker et al. | |
| 4,485,803 | A | * | 12/1984 | Wiener | 126/591 |
| 4,505,260 | A | * | 3/1985 | Metzger | 126/637 |
| 5,417,052 | A | * | 5/1995 | Bharathan et al. | 60/783 |
| 5,706,766 | A | * | 1/1998 | Koehler et al. | 122/6 A |
| 7,296,410 | B2 | | 11/2007 | Litwin | |
| 2001/0037641 | A1 | * | 11/2001 | Hannemann et al. | 60/39.12 |

FOREIGN PATENT DOCUMENTS

| DE | 2800439 | 7/1979 |
| DE | 19608138 | 6/1997 |
| FR | 2438804 | 5/1980 |
| WO | WO 97/14930 | 7/1979 |
| WO | WO2008/012390 | 1/2008 |

OTHER PUBLICATIONS

"Solar Thermal Power Generation", Stefan Bockamp et al., Powergen Conference, May 6, 2003, pp. 1-22, XP008084267.
"Technische Neuentwicklungen Machen Die Solarthermische Stromerzeugung Wirtschaftlich Interessant Solarkraftwerken Dampf Machen", Sonnenenergie, Solarpraxis AG, Berlin DE, vol. 26, No. 5, Nov. 1, 2001, pp. 53-55, XP001111127 ISSN: 0172-3278.
PCT International Search Report and The Written Opinion of the International Searching Authority dated May 10, 2010—(PCT/US2009/040328).

* cited by examiner

*Primary Examiner* — Hoang Nguyen

(57) ABSTRACT

A solar power generation system includes a solar receiver disposed on a tower that receives radiant heat reflected from a field of solar collectors. The solar receiver includes an evaporator having a plurality of vertically oriented tubes to form a panel for receiving a fluid, such as water and/or steam, wherein the tubes have a rifled internal surface. The fluid within the tubes has a mass flow greater than $0.2 \times 10^6$ lb/hr/ft$^3$ at a pressure in the range of 100-2850 psia, wherein radiant heat fluxes on the outside of the tubes exceed 185,00 but/hr/ft$^2$.

18 Claims, 3 Drawing Sheets

US 8,607,567 B2

SOLAR STEAM GENERATOR

CROSS-REFERENCE TO RELATED APPLICATIONS

This patent application claims the benefit of U.S. Provisional Patent Application No. 61/045,361, filed Apr. 16, 2008, which is incorporated herein in its entirety.

TECHNICAL FIELD

The present disclosure relates generally to a steam generator, and more particularly, to a solar steam generator having a receiver including boiler water walls composed of vertical panels of tubing having an internal rifled profile.

BACKGROUND

It is known in the prior art to use solar energy to power an electrical power generation system as shown in patent application no. 2005/0126170 and U.S. Pat. No. 4,387,574 which are incorporated herein by reference. One such solar-powered electrical power generation system 10, as shown in FIG. 1, provides a plurality of mirrors or heliostats 12 that reflect the solar radiant energy of the sun 14 onto a solar receiver 16 disposed on a tower 18. The solar receiver 16 includes serpentine tubes that receive the heat transfer fluid therethrough. The heat transfer fluid is delivered from the tower 18 to a steam generator 20, in which thermal energy is exchanged from the heat transfer fluid to water circulating in a separate fluid circuit 22. The heat transfer fluid is thereby cooled in the steam generator 20 and can then be re-circulated back to the receiver 16 for reheating. The water heated in the steam generator 20 forms steam that is circulated to a turbine generator 24, i.e., a turbine 26 coupled to an electrical generator 28. The steam expands and rotates the turbine 26 and the generator 28, and thus produces electricity. The steam can be passed through a condenser 30 that, in conjunction with a cooling tower 32, condenses the steam to form hot water that is further heated in a preheater 34 and can be circulated back to the steam generator 20 by a pump 36 for re-use. Pumps 38 can be used to circulate the heat transfer fluid and tanks 40,42 respectively can be used to store the heat transfer fluid before and after heating by the solar receiver 16.

The present invention provides features and configurations for improving the energy efficiency of a solar receiver and a solar power steam generation plant.

SUMMARY

According to the aspects illustrated herein, there is provided a solar receiver for a solar power generation system. The solar receiver including a panel of tubes receiving a fluid therethrough whereby solar energy is directed onto the tube for heating the fluid. Each of the tubes has a rifled internal surface.

According to the other aspects illustrated herein, there is a solar power generation system including a solar receiver disposed on a tower for receiving solar energy. The solar receiver includes at least one panel of tubes for receiving a fluid therethrough. Each of the evaporator tubes has a rifled internal surface. At least one solar reflector reflects radiant heat from the sun onto the evaporator for heating the fluid.

The above described and other features are exemplified by the following figures and detailed description.

BRIEF DESCRIPTION OF THE DRAWINGS

Referring now to the Figures, which are exemplary embodiments, and wherein the like elements are numbered alike.

DETAILED DESCRIPTION

Figure 2:
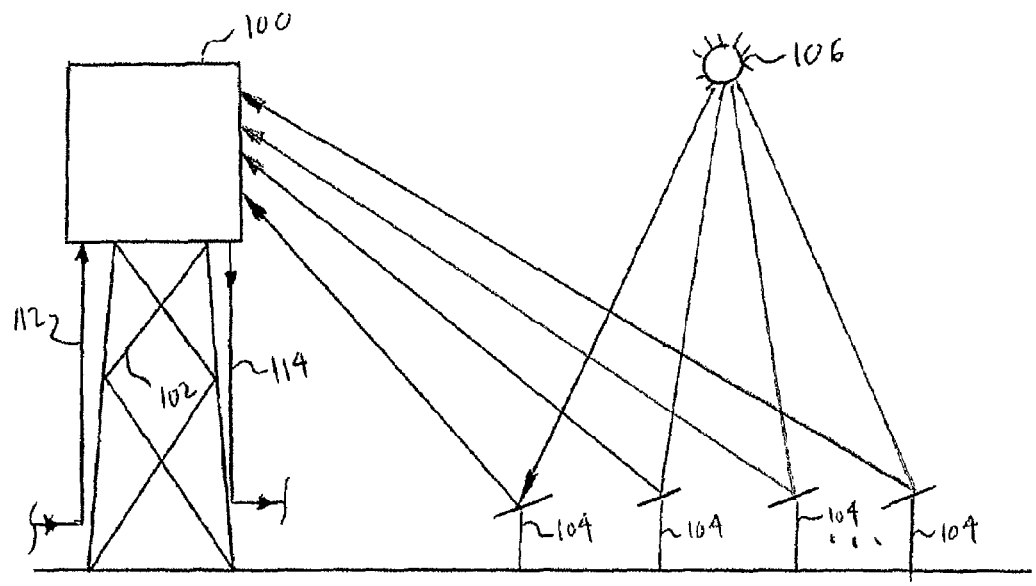
FIG. 2 is a schematic diagram of a solar receiver portion of a solar power generation system in accordance with the present invention.

Referring to FIG. 2, a solar receiver 100, in accordance with the present invention, is shown disposed on a tower 102 among a field of solar collectors 104, such as mirrors or heliostats. The solar collectors 104 are arranged approximate the tower for directing solar energy or solar radiation from the sun 106 to the solar receiver. The heliostats 104 may have a curved or flat configuration. Each heliostat can be independently adjustable in response to the relative position of the sun. For example, the heliostats can de arranged in arrays, whereby the heliostats of each array being controlled separately or in combination with the other heliostats of the array by one or more control devices (not shown) configured to detect and track the relative position of the sun. Thus, the heliostats 104 can adjust according to the position of the sun 106 to reflect sunlight onto the receiver 100, thereby warming the transfer fluid in the receiver.

Figure 3:
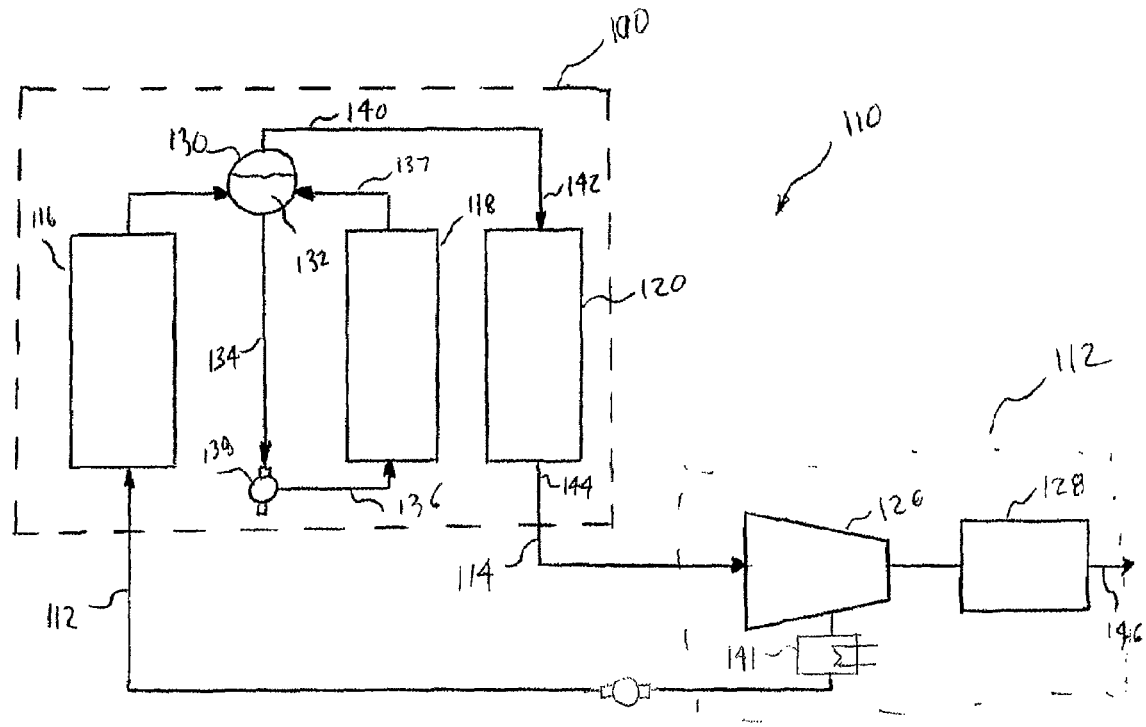
FIG. 3 is a block diagram of a solar steam generation system in accordance with the present invention.

In one embodiment of the invention, a solar steam generation system 110 is shown in FIG. 3, whereby water is heated in the solar receiver to produce steam for rotating a steam turbine generator 112. The solar receiver 110 comprises at least one panel of tubes (or tubing) that receives water (or other fluid) from an input pipe 112. As will be described in greater detail hereinafter, the solar receiver 110 may include a plurality of panels that perform different functions for transferring the radiant heat of the sun to the water and/or steam flowing through the tubes.

As shown in FIG. 2, the heliostats 104 direct the solar radiation of the sun onto the solar receiver 100, and more specifically onto the panel of tubes having water and/or steam flowing therethrough. The radiant heat increases the temperature of the water flowing therethrough to generate high temperature steam. The steam is then provided to a power generation system, e.g. turbine generator 112, via the output pipe 114. Specifically, as shown in FIG. 3, the steam is provided to a steam turbine 126, which powers a generator 128 to produce electricity 146.

FIG. 3 schematically illustrates the power generation portion 110 of the present invention, whereby the solar receiver 100 is shown in greater detail. As shown, the solar receiver comprises three primary components: an economizer 116, an evaporator 118, and a superheater 120. Each of these components comprises at least one panel 122 of at least one tube 124 (see FIGS. 4-6) that receives water and functions to increase the temperature of the water flowing through the respective tubes. Typically, each component 116, 118, 120 includes a plurality of panels, whereby each panel includes a plurality of tubes 124, similar to that shown in FIGS. 4-6, which will be described in greater detail hereinafter.

Figure 4:
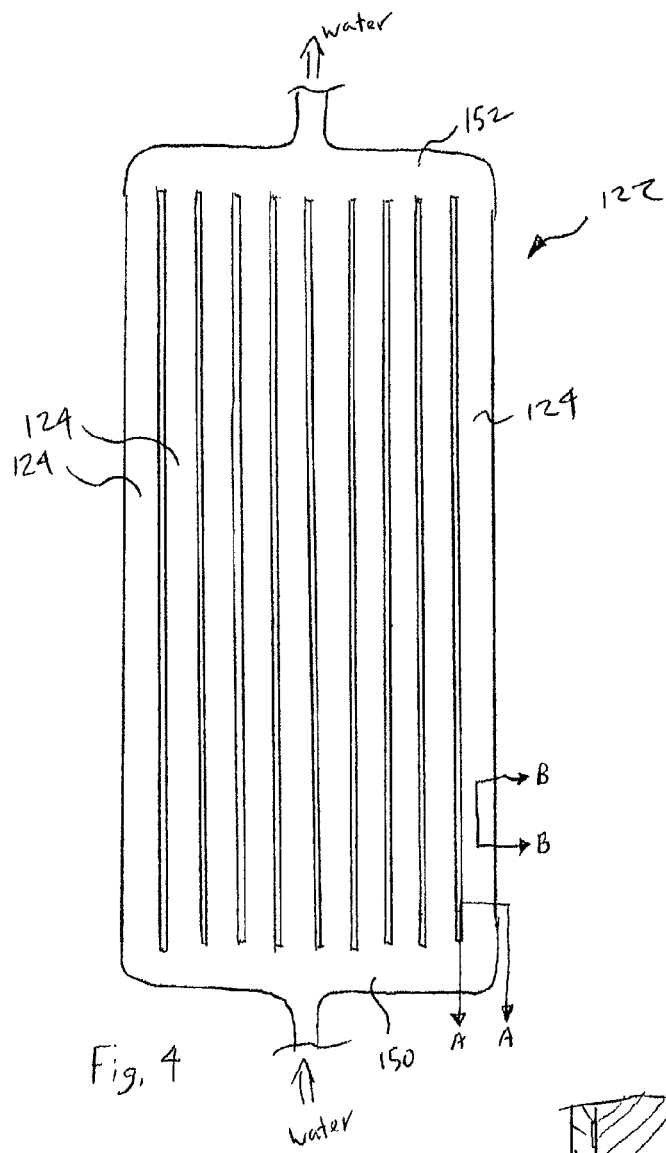
FIG. 4 is a plane view of a panel of an evaporator of the solar steam generation system of FIGS. 2 and 3 formed of an array of vertically-disposed rifled tubes.

The economizer 116 receives recycled water from the steam turbine 126. The water passes through at least one panel of tubes, as shown in FIG. 4. The radiant heat provided by the solar collectors 104 is directed onto the panel of tubes of the economizer, which preheats the water fed through the tubes of the economizer.

From the economizer, the water flow is directed to a steam drum 130. In the steam drum, the incoming water is distributed along the entire length of the drum by the water distribution header (not shown). Nozzles (not shown) in the distribution headers direct the incoming water in the downward direction in order to minimize turbulence and aid in circulation. The water mixes with the water 132 in the drum 130 and is directed to the downcomers 134. The downcomers 134 originate at the steam drum and terminate at the evaporator inlet 136, directing the water to the evaporator 118.

A circulating pump 138 pumps the recirculated water 132 from the steam drum 130 disposed at the top of the evaporator panel(s) (i.e., the water wall) to the bottom inlet of the evaporator panel(s). This circulating pump 138 provides a constant flow of cooling water to the evaporator panel(s) for all load conditions. This permits rapid response to load changes.

Saturated steam/water mixture from the evaporator 118 enters the steam drum 130 at 137 and is directed to two rows of separators (not shown). Steam exits the top of the steam drum through a saturated steam outlet 140 before entering the superheater section 120. The drum 130 is equipped with safety valves, vent valves, a pressure transmitter, a pressure gauge, level gauges, and level indicators (not shown).

From the steam drum 130, steam is directed to the superheater 120 through the superheater inlet 142 and then on to the super heater panels 122. From the superheater outlet 144, the steam is directed to the steam line 114. The superheater outlet is equipped with the following: safety valve, ERV and start-up vent, drain valves, motor operated stop valve, and pressure, flow, and temperature instrumentation (not shown).

The steam provided by the steam line 114 to the steam turbine expands and rotates the turbine 126 and the generator 128, thus producing electricity at 146. The steam exiting the turbine is fed back to the input pipe/line 112 to be recycled through the solar receiver 100. The solar generation system contemplates having a condenser 141 disposed intermediate the turbine 126 and the input pipe 112 of the solar receiver 100 for cooling the exiting turbine steam to condense the steam into liquid form.

Figure 1:
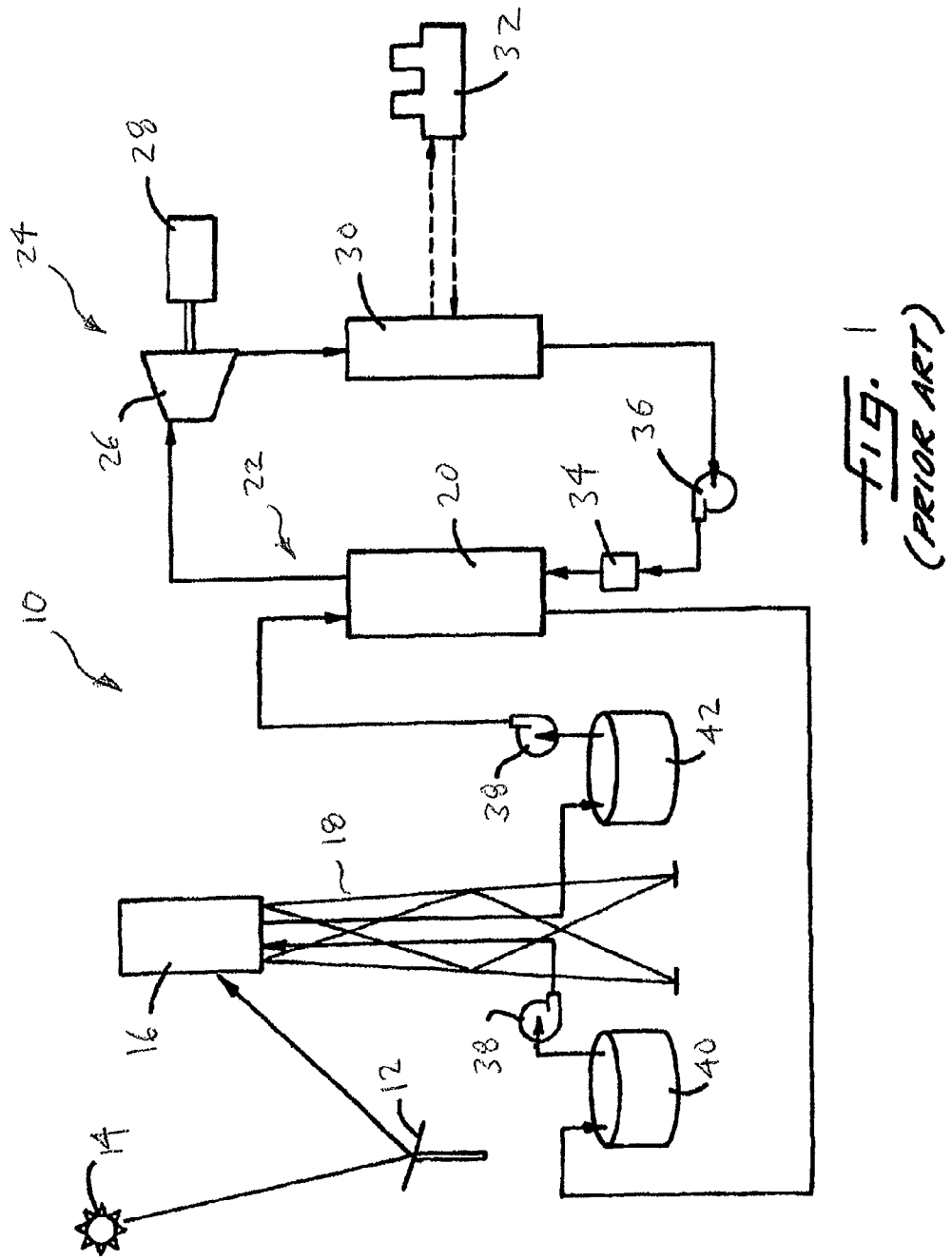
FIG. 1 is a schematic diagram of a prior art solar steam generation system.

As one will appreciate, the embodiment of a solar generation system 110, shown in FIGS. 2 and 3, provides a single fluid cycle, whereby the solar receiver 100 functions as a boiler for directly heating the water and/or steam by the solar energy provided by the field of solar receivers 104. Unlike the prior art solar generation system 10 shown in FIG. 1, which includes two fluid cycles, the embodiment shown in FIGS. 2 and 3 provide a more efficient configuration of generating power.

Furthermore, while the solar generation system 110, shown in FIGS. 2 and 3, includes an economizer 116 for preheating the water and a super heater 120 provided to the solar receiver 100, the present invention contemplates that an economizer and/or a super heater may not be necessary and therefore may be eliminated from the configuration of the solar receiver 100. This configuration without the economizer 116 and/or the super heater 120 contemplates that the radiant energy provided onto the panel(s) of the evaporator 118 is sufficient to heat the water and/or steam flowing therethrough to generate the desired amount and quality of steam.

FIG. 4 illustrates a panel 122 of tubes 124 referenced hereinbefore for the evaporator 118. As described, the evaporator 118 includes at least one of such panels 122 as will be described. It has been found that the configuration and features of the panel 122 provides very efficient heat transfer from the solar energy reflected onto the panel 122 and the water and/or steam flowing through the tubes 124, particularly in combination within a particular mass flow rate.

Figure 5:
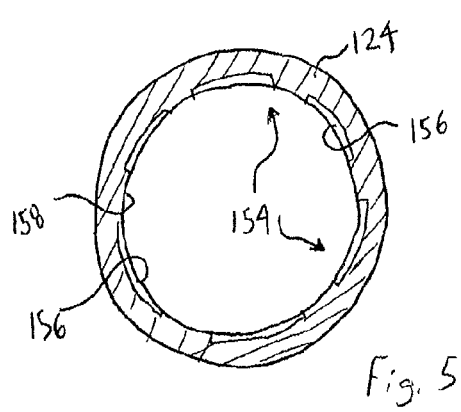
FIG. 5 is a cross-sectional view of a rifled tube of FIG. 4 taken along line A-A.
Figure 6:
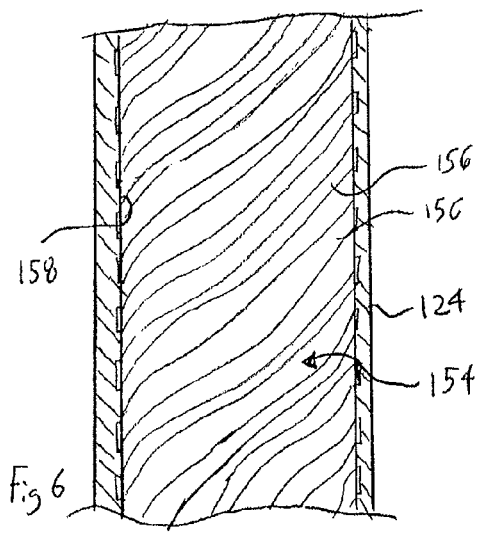
FIG. 6 is a cross-sectional view of a rifled tube of FIG. 4 taken along the line B-B.

Referring to FIGS. 4-6, the vertically-disposed panels 122 comprise a plurality of vertically disposed tubes interconnected in fluid communication by an inlet manifold 150 and an outlet manifold 152. As best shown in FIGS. 5 and 6, the tubes 124 (i.e., tubes) have internal rifling 154, namely spiral grooves 156 disposed in the internal walls 158 of the tubes 124. The swirling action imposed on the water/steam mixture flowing up or down the tubing 124 causes the water to remain on the inside wall 158 of the tube 124, thereby enhancing heat transfer performance from the tube wall 124 to the water/steam mixture. This enhanced performance reduces the required flow rate of the water/steam to avoid Departure from Nucleate Boiling (DNB), which provides protection of the tube walls 124 from the radiant heat from the reflected solar energy.

The rifling of the tubes 124 enable efficient heat transfer to the water/steam, particularly when the tubing is vertically oriented. The vertical-oriented tubing 124 is structurally superior to an inclined arrangement of the tubing. However, one will appreciate that while not ideal, the present invention contemplates the panels 122 having inclined tubing 124 with internal rifling.

A series of experimental measurements were conducted in support of the use of rifled tubing 124 for steam generation to determine the operating limits of such tubing. Based on these results, boiler designs using vertically-oriented, rifled tubing can operate safely.

It has been determined that the use of vertically-oriented rifled tubing used in the primary components 116, 118, 120 is particularly beneficial for conditions when the water/steam mass flows greater than $0.2 \times 10^6$ lb/hr/ft$^2$ to avoid DNB, the pressure of the water/steam in range of 100-2850 psia, and the radiant heat fluxes on the outside of the tubes exceed 185,000 Btu/hr/ft$^2$. Further beneficial is that the inlet water flow rate is such to ensure that the exit steam content of the water/steam mixture is less than 80% steam. Optimally, the outside diameter of the rifled tubes is 0.75"-1.25". One will appreciate that the configurations of the rifling of the tubes 124 may be of various configurations, including configurations available from commercial manufacturers. The circulating pump 138 in FIG. 3 circulates water from the steam drum 130 having capacity to supply the necessary flow for the above mass flows.

One will appreciate that while the evaporator 120 was shown and described as including a plurality of vertically-disposed tubing having internal rifling, the economizer 118 and the super heater 122 may also have a similar configuration.

While the embodiments of solar power generation systems 110 include an economizer 116, the present invention contemplates that the field of heliostats/mirrors provides sufficient radiant heat to thus eliminate the need for the economizer.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A solar receiver for a solar power generation system; said solar receiver comprising:
    a vertical panel of tubes receiving a fluid therethrough whereby solar energy is directed directly onto said vertical panel of tubes receiving the fluid for heating the fluid, each of said tubes having a rifled internal surface; and
    the fluid has a mass flow greater than $0.2 \times 10^6$ lb/hr/ft$^3$.

2. The solar receiver of claim 1, wherein the tubes are oriented substantially vertical.

3. The solar receiver of claim 2, wherein the pressure of the fluid within the tubes are approximately in the range of 100-2850 psia.

4. The solar receiver of claim 1, wherein the panel of tubes is an evaporator.

5. The solar receiver of claim 3, wherein solar receiver functions as at least one of an economizer, evaporator, and superheater.

6. The solar receiver of claim 3, wherein radiant heat fluxes on the outside of the tubes exceed 185,00 btu/hr/ft$^2$.

7. The solar receiver of claim 1, the panel includes an input manifold for receiving the fluid and an output manifold for outputting the fluid, wherein input ends of the tubes are in fluid communication with the input manifold and the output ends of the tubes are in fluid communication with the output manifold.

8. The solar receiver of claim 1, wherein the fluid is one of water or a water and steam combination.

9. A solar power generation system comprising:
    a solar receiver disposed on a tower for receiving solar energy, the solar receiver including at least one vertical panel of tubes for receiving a fluid therethrough, each of said tubes having a rifled internal surface; and
    at least one solar reflector to reflect radiant heat from the sun directly onto said at least one vertical panel of tubes receiving the fluid for heating the fluid; and
    the fluid has a mass flow greater than $0.2 \times 10^6$ lb/hr/ft$^3$.

10. The solar power generation system of claim 9, wherein the tubes are oriented substantially vertical.

11. The solar power generation system of claim 10, wherein the pressure of the fluid within the tubes are approximately in the range of 100-2850 psia.

12. The solar power generation system of claim 11, wherein radiant heat fluxes on the outside of the tubes exceed 185,00 btu/hr/ft$^2$.

13. The solar power generation system of claim 9, the panel includes an input manifold for receiving the fluid and an output manifold for outputting the fluid, wherein input ends of the tubes are in fluid communication with the input manifold and the output ends of the tubes are in fluid communication with the output manifold.

14. The solar power generation system of claim 9, wherein the fluid is one of water or a water and steam combination.

15. The solar power generation system of claim 9, wherein the at least one panel of tubes is an evaporator.

16. The solar power generation system of claim 9, wherein the tubes of the at least one panel are vertically oriented.

17. The solar power generation system of claim 15, further including a steam drum for receiving fluid from an input source and an output of the evaporator and providing liquid to an input of the evaporator, and further includes a super heater for receiving steam from the steam drum, the super heater including a plurality of tubes having a rifled internal surface for heating the steam.

18. The solar power generation system of claim 9, further including a steam turbine for receiving steam from the solar receiver to rotate a generator for providing electricity.

* * * * *